United States Patent
Thalhammer et al.

(10) Patent No.: US 6,911,559 B1
(45) Date of Patent: Jun. 28, 2005

(54) METHOD OF PRODUCING SODIUM DICYANAMIDE

(75) Inventors: Franz Thalhammer, Trostberg (DE); Helmut Tautz, Abensberg (DE)

(73) Assignee: Degussa AG, Trostberg (DE)

( * ) Notice: Subject to any disclaimer, the term of this patent is extended or adjusted under 35 U.S.C. 154(b) by 0 days.

(21) Appl. No.: 09/890,544

(22) PCT Filed: Feb. 4, 2000

(86) PCT No.: PCT/EP00/00900

§ 371 (c)(1), (2), (4) Date: Jul. 31, 2001

(87) PCT Pub. No.: WO00/46151

PCT Pub. Date: Aug. 10, 2000

(30) Foreign Application Priority Data

Feb. 6, 1999 (DE) .......................... 199 04 877

(51) Int. Cl.$^7$ ............................. C07C 261/04
(52) U.S. Cl. ................. 564/106; 564/103; 564/104
(58) Field of Search ................. 564/103, 104, 564/106

(56) References Cited

U.S. PATENT DOCUMENTS

| 2,562,869 A | * | 7/1951 | Nagy .................... 564/106 |
| 3,052,517 A | | 9/1962 | Gilbert, Jr. ................ 23/78 |
| 3,279,885 A | * | 10/1966 | Sprague et al. ............ 564/106 |

FOREIGN PATENT DOCUMENTS

| GB | 1218470 | 1/1971 |
| JP | 62-288102 | 5/1988 |
| JP | 63-256513 | 2/1989 |

* cited by examiner

*Primary Examiner*—Peter O'Sullivan
(74) *Attorney, Agent, or Firm*—Fulbright & Jaworski L.L.P.

(57) ABSTRACT

A process is described for preparing sodium dicyanamide, in which cyanamide is reacted simultaneously with sodium hydroxide solution and cyanogen chloride in aqueous solution at temperatures of 20 to 100° and a pH of 7.0 to 10.0. By means of the inventive process it is possible, starting from raw materials which are available in technical-grade quality, to prepare sodium dicyanamide in good yields of 75 to 95% and very high purities of up to 100% in a very environmentally friendly manner, for which reason this process is particularly highly suitable for the industrial scale.

17 Claims, No Drawings

METHOD OF PRODUCING SODIUM DICYANAMIDE

DESCRIPTION

The present invention relates to a preferably continuous process for preparing sodium dicyanamide which is suitable in particular for the industrial scale.

Sodium dicyanamide is used in large amounts for preparing biocidal active compounds in the sanitary and healthcare sectors and for disinfection in food production.

According to the prior art, various methods are used for preparing sodium dicyanamide. Thus, for example, CA Vol. 109, 218 568 (1988) describes the reaction of ammonia with cyanogen chloride and metal hydroxides at 20 to 30° C. This achieves a conversion rate of 90.5% with a purity of 94.3%. However, this procedure is associated with some fundamental disadvantages. The low temperature level in the highly exothermic reaction requires the use of cooling brine and thus expensive electrical cooling energy. Since the space/time conversion rate is determined primarily by the effectiveness of heat removal and, in the case of this process, furthermore a relatively large amount of heat of reaction is liberated, very high production costs because of the relatively large apparatuses and poor heat balance must be expected. In addition, roughly twice the amount of cyanogen chloride and sodium hydroxide solution are consumed per mole of sodium dicyanamide in order to prepare the intermediate cyanamide. In addition, an equimolar amount of contaminated sodium chloride is produced, which must be disposed of in a very costly manner, which appears problematic with respect to environmental aspects.

A general problem in the preparation of sodium dicyanamide is removing the by-product sodium chloride, since the two compounds are sodium salts with good solubility in water. A process in which twice the amount of sodium chloride is produced in a mixture with the target product thus also leads to considerably impaired yield of pure sodium dicyanamide.

The sodium dicyanamide purity required by active compound manufacturers is customarily at least 97% by weight, frequently even at least 98% by weight, which is not achieved by the process according to CA 109; 210 568 (1988).

A similar process is described in CA Vol. 110; 138 089 (1989), in which a solution of cyanogen chloride in benzene is charged and ammonia is added. The amount of cyanogen chloride charged and the use of organic solvent, in this case the carcinogenic benzene, make this process impracticable on the industrial scale.

Canadian Patent 956 081 describes an alternative synthetic pathway for sodium dicyanamide, starting from cyanamide, sodium cyanide and chlorine, with addition of sodium hydroxide solution.

From the reaction equation it is clear that, in this process also, two moles of sodium chloride are formed per mole of sodium dicyanamide, with the result that the separation problems already described above occur with adverse consequences on product purity and yield. Although the process gives conversion rates of >96%, isolated yields of 73 to 78% are obtained at a purity of 73 to 86% by weight. This reflects the difficulty of the sodium chloride removal which has been discussed. From the aspect of raw material and disposal costs, this process is also disadvantageous, since the raw materials sodium cyanide and chlorine used are considerably more expensive than cyanogen chloride and sodium hydroxide solution.

The object underlying the present invention, therefore, was to develop a process for preparing sodium dicyanamide which does not have said disadvantages corresponding to the prior art, but which permits sodium dicyanamide to be prepared from inexpensive raw materials which are available on an industrial scale and thus meets the stringent requirements of safety and product purity.

This object is achieved according to the invention by cyanamide being reacted simultaneously with sodium hydroxide solution and cyanogen chloride in aqueous solution at temperatures of 20 to 100° C. and a pH of 7.0 to 10.0.

It has surprisingly been found here that an extremely pure sodium dicyanamide can be obtained in very good yields even with the use of technical-grade raw materials. This was surprising because the process can be carried out even at elevated temperature conditions without disadvantageous effects on purity of the product and selectivity of the reaction and it is known to those skilled in the art that under the claimed reaction conditions, usually cyanamide is very rapidly dimerized and cyanogen chloride is very rapidly hydrolyzed to cyanate by sodium hydroxide solution. Against this background, among those skilled in the art there was the prejudice for keeping the reaction temperature as low as possible for reactions with cyanogen chloride in aqueous alkali media.

In the process according to the present invention, cyanamide in aqueous solution is simultaneously reacted with sodium hydroxide solution and cyanogen chloride in. The choice of cyanamide as raw material means that in the reaction only 1 equivalent of sodium chloride is produced as by-product. Preferably, cyanamide is used in the form of a 20 to 60% by weight aqueous solution, in particular in the commercially conventional concentration of 50% by weight (SKW cyanamide L500) and the sodium hydroxide solution is used as 10 to 50% by weight aqueous solution, in particular 20 to 30% by weight solution. If the concentration of cyanamide is decreased, it is advantageous to increase the content of sodium hydroxide solution, and vice versa.

The product concentration can be controlled as desired by the concentration of the raw materials cyanamide and sodium hydroxide solution. Thus, preferably, raw material concentrations are used from which, without evaporation or dilution operations, a product concentration results at which the reaction product remains completely in solution and from which, during the crystallization, sodium dicyanamide crystallizes out to the greatest possible extent, but the stoichiometric by-product sodium chloride does not yet crystallize out. However, in principle, it is possible to choose the concentrations of these reaction components independently and as desired, if the abovementioned advantage of a direct crystallization of the product is not intended or if the reaction mixture is set later to the desired concentration by concentration or dilution.

Cyanogen chloride may preferably be used according to the inventive process as a technical-grade gas, which is of critical importance both for the economic efficiency and for plant safety. Firstly, in contrast to the use in condensed or dissolved form, the holdup in a plant can be kept extremely low, even for an industrial scale production, and thus hazard to personnel and environment can be virtually excluded. In the case of gaseous cyanogen chloride, in contrast to condensed or highly concentrated solutions, there is also not the risk of a spontaneous highly exothermic trimerization.

Technical-grade cyanogen chloride also comprises minor components in the range from 3 to 8% by volume, for example carbon dioxide or chlorine. In this case also, it has surprisingly been found that these minor components lead to completely harmless products, which are not present in the isolated sodium dicyanamide.

It is considered an important advantage of the inventive process that the reaction, in contrast to the prior art, can be carried out even at elevated temperature, in particular at 40 to 80° C., without side reactions occurring to an increased extent in this case. This has critical consequences from the ecological and process-engineering aspects. Firstly, the great exothermy of the reaction is utilized to heat the reaction parameters added cold; secondly, the excess heat can be simply removed via a heat exchanger using cold water. In the processes corresponding to the prior art, the temperature gradient of reaction solution to cooling water is not sufficient for an economic procedure, so that electrical cooling energy must be employed.

When the inventive reaction is carried out, it has proved to be particularly advantageous to control the amounts of reaction participants in a targeted manner. This is because it has been found in this case that the reaction and also the following process steps proceed optimally if a defined stoichiometric ratio is maintained during each phase of the metering. The metering of sodium hydroxide solution and cyanamide is preferably implemented by a rate measurement, as a function of the concentration of these raw materials. In this case the ratio of the reactants is preferably set in such a manner that 2.0 to 2.4 mol, preferably 2.1 to 2.2 mol, of sodium hydroxide are used per mole of cyanamide. The exact ratio is dependent on the purity of the cyanogen chloride used.

Exact and reliable rate-controlled metering of gaseous industrial-grade cyanogen chloride is extremely difficult from the metrological aspect. Conventional apparatuses for flow metering are of little use in practice. For this reason, preferably, cyanogen chloride is added under pH control in such a manner that in the reaction solution a pH of 7.0 to 10.0, preferably 7.0 to 8.5, is maintained. At this pH, the reaction partners react immediately in the desired manner. At a lower pH there is the risk that the extremely toxic cyanogen chloride is not reacted completely to exhaustion and is released during work-up. At higher pHs, side reactions such as hydrolysis of cyanogen chloride and dimerization of cyanamide occur to an increased extent. Generally, cyanogen chloride is used in an equimolar, or approximately equimolar, ratio based on the cyanamide used. According to a preferred embodiment, the raw materials are metered in separately simultaneously to a reactor with good mixing and the reaction solution is taken off continuously. Although prior mixing of cyanamide and sodium hydroxide solution, or cyanamide and cyanogen chloride, is possible in principle, it has disadvantages with respect to product quality or process safety.

By means of the simultaneous metering of the raw materials into a reactor (for example a residence-time reactor) with good mixing, the same concentration, temperature and pH conditions are always present during the entire course of the reaction. This leads to two important beneficial effects, that is to say, firstly, minimizing unwanted by-products, for example dicyanodiamide and sodium N-cyanoisourea, which inhibit a clean selective crystallization of the product and are themselves difficult to remove. Secondly, as a result, the dimensions of the reactor, the heat exchanger and other apparatuses can be reduced, which leads to considerable savings in capital costs and maintenance. Suitable reactors are, for example, recirculation reactors equipped with static mixers or mixing nozzles or tubular reactors having gas-introduction agitators.

Following the reaction, sodium dicyanamide can be crystallized out in very high purity from the hot reaction solution directly by targeted crystallization either batchwise or via a controlled cooling curve or a continuous crystallizer. If the procedure starts from technical-grade raw materials, the reaction solution can still contain small amounts of discoloring impurities, which are generally not of high-molecular-weight nature.

According to a preferred embodiment, this discoloration can be effectively eliminated by treatment with activated carbon, even in very low amounts. For this, the product solution is admixed hot with 0.1 to 5 g of activated carbon per liter and the carbon is removed again in a conventional manner before the crystallization. Alternatively, the solution can also be run through an activated carbon bed or filters prepared with activated carbon.

An important advantage of the present invention must be considered to be the fact that, despite a high concentration, the product is maintained dissolved in the reaction solution, or is brought completely into solution by further heating to, for example, 60 to 100° C.

Starting from this solution, by controlled cooling, selective crystallization of sodium dicyanamide can be achieved, while the stoichiometric by-product sodium chloride remains in solution. Crystallization proceeds uniformly without formation of cocrystals or inclusions, so that complex recrystallization of the product or other work-up is not required. Selective crystallization of sodium dicyanamide is also possible by controlled continuous addition of hot sodium dicyanamide solution to a cooled product suspension, or by concentration from dilute solutions, if appropriate with simultaneous cooling. It is critical in this case that the solution does not fall below the solubility curve of sodium chloride.

Sodium dicyanamide is isolated then in a customary manner by filtration, with adherent residual mother liquor being able to be removed by careful washing with water.

Using the inventive process it is possible, starting from raw materials available in technical-grade quality, to prepare sodium dicyanamide in a very environmentally friendly manner in good yields of approximately 75 to 95% and very high purities of up to 100%, for which reason this process is particularly highly suitable for the industrial scale.

The examples below are intended to illustrate the invention in more detail.

EXAMPLES

Example 1

A 2.5 l recirculation reactor equipped with temperature and pH measurement, heat exchanger and metering system having a static mixer was operated continuously. The metering system consisted of a glass tube in the reactor circuit having separate ports for cyanamide, sodium hydroxide solution and cyanogen chloride. Immediately downstream of these metering ports was a mixing section (Ø 1.6 cm, length 5 cm) containing Sulzer mixing elements. The mean circulation rate was 14 l/min. At the start, the reactor was charged with water at 60° C. and then metering of the raw materials was started.

The following amounts were added per hour via peristaltic pumps:

| Raw material | Concentration | Amount/h | Mol/h |
| --- | --- | --- | --- |
| Cyanamide | 50.1% | 515 g | 6.13 |
| Sodium hydroxide solution | 28.0% | 1 857 g | 13.00 |

Technical-grade cyanogen chloride was introduced simultaneously in the gaseous state in such a manner that a pH of 7.5 to 8.0 was maintained. The consumption was determined at 370 g/h (6.02 mol/h) based on pure substance. At this metering rate a mean residence time of 1 hour 35 minutes in the reactor resulted. The heat exchanger was charged with enough cooling water to set a reaction temperature of 70 to 75° C. The volumes metered in were taken off via a free overflow and passed through a bed containing powdered activated carbon (10 g per 15 l of reaction solution) into a buffer vessel. The buffer vessel was kept at 75° C. during charging and then cooled to 0° C. in the course of 7.5 hours using a linear cooling curve. By alternately filling two buffer vessels, the reaction could be conducted continuously. After crystallization, the product was filtered off using suction and washed with 500 ml of ice water per kg of filter cake. Sodium dicyanamide was obtained at a purity of 100% without detectable contamination with dicyandiamide or sodium N-cyanoisourea, and with a chloride content of 0.2%. The APHA value (discoloration) of a 10% strength solution in water was 10. The yield isolated was 76%, based on cyanamide used.

Example 2

In a similar manner to Example 1, sodium dicyanamide was prepared continuously in the apparatus described except that the reaction solution was not filtered through activated carbon. The sodium dicyanamide isolated had a purity of 99% without detectable contamination with dicyandiamide or sodium N-cyanoisourea, and with a chloride content of 0.6%. The APHA value (discoloration) of a 10% strength solution in water was 55.

Example 3

A recirculation reactor system having a total volume of 4.2 l, consisting of a double-jacketed glass vessel, a diaphragm recirculation pump and a metering system for the raw materials was operated continuously to prepare sodium dicyanamide. The metering system consisted of a driving jet nozzle operated with reaction solution, which drew in gaseous cyanogen chloride and mixed it with the reaction partners cyanamide and sodium hydroxide solution which were metered in immediately at the nozzle exit via peristaltic pumps. Via the lid of the glass vessel, a free overflow led into a buffer vessel heated to 70° C. In the glass vessel temperature and pH were monitored and the metering of the raw materials was controlled accordingly. The amount circulated was taken off from the bottom of the reactor and brought to the pressure of 1.4 bar which was required for the driving jet by means of a diaphragm pump. To even out the pressure, an equilibration vessel was connected between pump and driving jet nozzle. This experimental arrangement was operated with the following parameters:

| | |
| --- | --- |
| Circulation rate: | 210 l/hour |
| Constant molar ratio of sodium hydroxide to cyanamide = 2.18 | |
| Concentration of cyanamide: | 50.0% |
| Concentration of sodium hydroxide solution: | 28.0% |
| Temperature in the recirculation reactor: | 70 to 75° C. |
| Nozzle pressure: | 1.4 bar |
| pH: | 7.2–8.0 |
| Metering rates: | |
| Cyanamide: | 925 g/hour = 11.01 mol/hour |
| Sodium hydroxide solution: | 3430 g/hour = 24.01 mol/hour |
| Cyanogen chloride (96% pure): | 705 g/hour = 11.01 mol/hour |

At the start, the recirculation reactor was filled with water at 70° C. and the circulation rate was set. The raw material metering was then started, with the cyanogen chloride rate being controlled in such a manner that the internal temperature, under external cooling with cooling water (18° C.), remained in the range 70 to 75° C. The liquid components cyanamide and sodium hydroxide solution were fed at a constant molar ratio via controllable peristaltic pumps under pH monitoring. Via the free overflow, the product solution was collected in the buffer vessel and after it was filled, drained off into an agitated crystallization vessel. The solution was cooled to 0° C. in the course of 4 hours via a linear cooling curve and the product was isolated by filtration on a vacuum filter funnel. The product was washed with 500 ml of ice water per kg of filter cake and dried under reduced pressure at 6° C. In this manner, 803 g (=82% of theory) of sodium dicyanamide at a purity of 98.5% were obtained per hour. The sole impurity present at >0.1% was sodium chloride at 1.3%.

Example 4

In a similar manner to Example 3, a sodium dicyanamide solution was prepared continuously, but, downstream of the free overflow, this was run out of the reactor system directly into a product suspension charged into the buffer vessel and cooled to 0° C. After the buffer vessel was filled, this was emptied down to a remainder of approximately 1 liter and filled again without interruption. The sodium dicyanamide suspension take off was filtered in the usual manner, the filter cake was washed and dried.

814 g (=83% of theory) of sodium dicyanamide at a purity of 98.3% were obtained per hour.

Example 5

In a similar manner to Example 3, sodium dicyanamide was prepared, but the filter cake was not washed during the product isolation. 920 g/hour (=94% of theory) of sodium dicyanamide at a purity of 94.8% were obtained. The product comprised 4.8% of sodium chloride and 0.18% of sodium N-cyanoisourea.

Example 6

Sodium dicyanamide was prepared in accordance with Example 3, except that in the reaction part a temperature of 50 to 55° C. was maintained, whereas in the buffer vessel a temperature of 900° C. was set.

Because of the low temperature level for the same cooling area, in this experiment the following amounts could be metered per hour:

823 g (9.8 mol) of cyanamide (50% strength)

3050 g (20.4 mol) of sodium hydroxide solution (28% strength)

608 g (9.5 mol) of cyanogen chloride (96% strength)

During the reaction, crystals had already formed, which redissolved in the heated buffer vessel, however. After the corresponding work-up, 690 g/hour (79% of theory) of sodium dicyanamide at a purity of 97.6% were obtained.

Example 7

Sodium dicyanamide was prepared continuously in accordance with Example 6, except that a 15% by weight sodium hydroxide solution was used. The following amounts were metered per hour in this case:

820 g (9.8 mol) of cyanamide (50% strength)

5700 g (20.4 mol) of sodium hydroxide solution (15% strength)

600 g (9.4 mol) of cyanogen chloride (96% strength)

A reddish-brown solution was obtained which was run through an activated carbon bed (1 g per liter of solution) at 55° C., at a residence time of 10 min. The filtered solution was then evaporated under reduced pressure (approximately 200 mbar) until a thin crystal slurry was formed at 60° C. This slurry was cooled in a linear manner to 0° C. in the course of 3 hours and the product isolated in the usual way. 730 g (87% of theory) of sodium dicyanamide at a purity of 97.2% were obtained per hour. The sodium chloride content in the product was 2.4%.

What is claimed is:

1. A process for preparing sodium dicyanamide comprising simultaneously reacting cyanamide in aqueous solution with a sodium hydroxide solution and cyanogen chloride, at a temperature of from 40° C. to 100° C., and at a pH of from 7.0 to 10.0.

2. The process as claimed in claim 1, wherein cyanamide is used as a 20 to 60% by weight aqueous solution.

3. The process as claimed in claim 1, wherein the sodium hydroxide solution is used as a 10% to 50% by weight aqueous solution.

4. The process as claimed in claim 1, wherein cyanogen chloride is used in the gaseous state and in technical grade quality.

5. The process as claimed in claim 1, wherein the reaction temperature is 50 to 80° C.

6. The process as claimed in claim 1, wherein the pH is set at from 7.0 to 8.5.

7. The process as claimed in claim 1, wherein 2.0 to 2.4 mol of sodium hydroxide are used per mole of cyanamide.

8. The process as claimed in claim 1, wherein the cyanogen chloride is used at an equimolar, or approximately equimolar, ratio based on the cyanamide used.

9. The process as claimed in claim 1, wherein the cyanamide, sodium hydroxide and cyanogen chloride are metered to a reactor separately but simultaneously while mixing, continuously and reaction solution is removed continuously.

10. The process as claimed in claim 1 comprising metering the cyanogen chloride while maintaining a constant pH.

11. The process as claimed in claim 1 wherein cyanamide, sodium hydroxide and cyanogen chloride are used at concentrations such that the sodium dicyanamide produced remains completely in solution at the reaction temperature used.

12. The process as claimed in claim 1, comprising crystallizing the sodium dicyanamide out of the reaction solution and separating it therefrom.

13. The process as claimed in claim 12 comprising treating the reaction solution with activated carbon before crystallizing the sodium dicyanamide.

14. The process as claimed in claim 13, wherein the reaction is treated with 0.1 g to 5.0 g of activated carbon per liter of solution.

15. The process of claim 2, wherein the sodium hydroxide solution is used as a 10% to 50% by weight solution.

16. The process of claim 2, wherein the sodium hydroxide solution is used as a 20% to 30% by weight solution.

17. The process of claim 12, comprising separating said sodium dicyanamide by filtration.

* * * * *